United States Patent Office 3,079,399
Patented Feb. 26, 1963

3,079,399
SUBSTITUTED PYRROLIDINONES AND
METHODS OF PREPARATION
Lawrence J. Exner, Cheltenham, Pa., assignor to Rohm
& Haas Company, Philadelphia, Pa., a corporation of
Delaware
No Drawing. Filed May 12, 1960, Ser. No. 28,556
17 Claims. (Cl. 260—325)

This invention concerns 2-pyrrolidinones, which are substituted in the 5-position by a 2-oxo-4-cyano group, and the spirans corresponding to these substituted 2-pyrrolidinones that result from the situation where the R substituents defined below, joining in pairs form carbocyclic rings as provided for hereinafter. These pyrrolidinones may be represented by Formula I. Another embodiment of the invention provides for the acids corresponding to these 2-oxo-4-cyanoalkyl substituted pyrrolidinones in which the cyano radical is replaced by a carboxylic group. A further embodiment of the invention provides for a process for preparing these 2-pyrrolidinones.

The compounds of the invention may be represented by the following formula

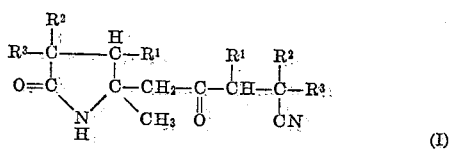
(I)

in which the substituents R are defined further below.

The 5-substituted 2-pyrrolidinones of the invention may be described as dimers which result from a method which comprises contacting a cyanoketone which is further described below with a strong alkaline catalyst.

The cyanoketones which are employed as starting materials in the method of the invention may be defined by the following formula:

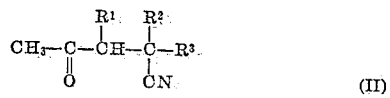
(II)

in which $R^1$, $R^2$ and $R^3$ are a hydrogen atom, an alkyl group containing 1 to 6 carbon atoms, or a hydrocarbon group containing from 5 to 10 carbon atoms and including cycloalkyl, aralkyl, aryl, and alkaryl groups, the substituents which $R^1$, $R^2$ and $R^3$ represent may be identical or not; also, $R^1$ and $R^2$, taken together with the carbon atoms to which they are bonded, form a carbocyclic ring containing 5 to 6 carbon atoms, which in turn may have alkyl substituents containing each a total of no more than four carbon atoms; $R^2$ and $R^3$ taken together with the carbon atom to which they are bonded, form a carbocyclic ring containing 5 to 6 carbon atoms, which in turn may have alkyl substituents containing each a total of no more than four carbon atoms; with the proviso that $R^1$, $R^2$ and $R^3$ are never all hydrogen atoms concurrently. Preferably, the total number of carbon atoms in these cyanoketones does not exceed twenty-four carbon atoms.

Illustrative of the cyanoketones that are useful reactants are the following:

3 - methyl-4-oxopentanenitrile, 2,2-dimethyl-4-oxopentanenitrile, 2 - methyl-2-ethyl-4-oxopentanenitrile, 2-methyl - 2-(2,2,4,4-tetramethylpentyl)-4-oxopentanenitrile, 2-methyl - 2-neopentyl-4-oxopentanenitrile, 2-acetyl-1-methylcyclopentanecarbonitrile, 2 - acetylcyclohexanecarbonitrile, 2 - methyl-2-cyclohexyl-4-oxopentanenitrile, 1-(2-oxopropyl)cyclopentanecarbonitrile, 1 - (2-oxopropyl)cyclohexanecarbonitrile, 2 - (1-pentyl-2-oxopropyl)pentanenitrile, 2 - acetyl-1-hexylcyclopentanecarbonitrile, 2-butyl - 2-naphthyl-4-oxopentanenitrile, 3,3-dimethyl-2-(2-oxopropyl) - bicyclo[2.2.1]heptane-2-carbonitrile, 2-hexyl - 2 - methyl-3-pentyl-4-oxopentanenitrile, 2-benzyl-2-methyl - 3 - phenyl-4-oxopentanenitrile and the like. Most unexpectedly, levulonitrile fails to yield the corresponding cyclic dimer.

The preparation of the 5-substituted 2-pyrrolidinones of the invention comprises bringing together a cyanoketone of Formula II with a strong alkaline catalyst. When two cyanoketones, that are dissimilar with respect to at least one R substituent, are contacted with the alkaline catalyst there is formed, in addition to the dimers of the starting cyanoketones, addition products of the different cyanoketones. In the method of the invention, the reaction is exothermic and, accordingly, the temperature is not critical, except that for best yields, cooling may be applied. For the more sluggish cyanoketones some initial heating may be desirable to promote the start of the reaction unless it is desired to obtain this effect by adjustment of the type and/or amount of basic catalyst.

An overall temperature range of $-50°$ to $200°$ C. may be suggested for the reaction, a lower range as from $-50°$ to $50°$ C. being better suited for initiating the reaction of the more reactive cyanoketones, whereas generally the preferred temperature range extends from $0°$ to $150°$ C. Since atmospheric pressures are entirely satisfactory, there is no need for sub- or superatmospheric pressures. As the reaction proceeds and reaches towards completion, the heat abates until it is finally dissipated, and this may be taken as a convenient measure of the progress of the reaction.

The exact proportion of cyanoketone that is reacted is not critical since the dimers are readily formed under the conditions prescribed, regardless of the specific amount of each cyanoketone used.

Generally, it is advantageous to carry out the reaction in an inert volatile organic solvent, such as aliphatic and aromatic hydrocarbons, ethers, and esters, such as ethyl acetate, methyl propionate, and the like, benene, toluene, xylene, dioxane, diethyl ether, dimethyl ether of ethylene glycol, and the like. At the conclusion of the reaction the solvent is readily removed such as by stripping, preferably at reduced pressures. Preferably enough solvent is present to insure optimum interaction between the cyanoketone and the basic catalyst.

In accordance with the invention, there is employed a strong alkaline catalyst which promotes the formation of the addition products from the specified cyanoketones. For this purpose, there may be employed any strong base. Typical are the alkali metals and the alkaline earth metals, such as lithium, sodium, potassium, strontium, barium, and calcium; alkali metal oxides their hydroxides such as sodium hydroxide, potassium hydroxide; their oxides such as lithium oxide, sodium oxide, and potassium oxide; their cyanides such as potassium cyanide and lithium cyanide; alkali metal lower alkoxides such as lithium butoxide, sodium methoxide, sodium t-butoxide and potassium ethoxide; alkali metal hydrides such as sodium hydride and potassium hydride; alkali metal amides such as sodium amide, lithium amide, potassium amide; alkali metal lower alkyls, alkenyls and alkynyls such as methyl lithium, ethyl sodium, butyl potassium, allyl sodium, and butenyl potassium; phenylalkyl alkali metals such as benzyl sodium, phenylisopropyl potassium, sodium phenylacetylide and alkali metal aromatics such as phenyl sodium, phenyl lithium and phenyl potassium, phenyl butyl sodium; "Alfin" catalysts, which are commercial mixtures of alkali metal alkenyls and alkali metal alkenoxides, such as allyl sodium with sodium allyloxide and butenyl potassium with sodium butenyloxide; and quaternary ammonium bases such as trimethylbenzylammonium hydroxide and dimethyldibenzylammonium hydroxide and the corresponding alkoxides such as trimethylbenzylammonium butoxide, choline methoxide, and the like.

The proportion of the base which is used may range from the smallest catalytic amount which will promote reaction to an amount which causes its maximum practical speed with the individual cyanoketone selected. This proportion may vary from about 0.1 mole percent to about 30 mole percent of base, 0.5 to 10 mole percent generally giving an efficient rate of reaction, suitable adjustment of the amount of catalyst used being performed to best suit the individual cyanoketone and base selected.

As the reaction proceeds, solid product may separate from the solvent. When it is liquid, it is recovered by stripping, followed by recrystallization or distillation. Recrystallization of the product may be carried out in any suitable manner from the solvent used in the formation of addition product or from other suitable solvents, such as chlorinated hydrocarbons, such as ethylene dichloride, chloroform, and the like. The addition products are generally obtained in very good yields, usually in a yield over 70%. The products are useful compounds; they are valuable pesticidal agents.

In another valuable embodiment of the invention, there is provided the acids corresponding to the 2-pyrrolidinones of Formula I, which have, in the substituent bonded in the 5-position a carboxyl group in the 4-position instead of a nitrile group. These acids are prepared by a process which comprises hydrolyzing the pyrrolidinone of Formula I in the presence of a strongly basic medium to give a salt, and then by acidifying the medium, thereby freeing the acid from its salt. The heating temperature, in the presence of an aqueous base, is 50 to 150° C. and the preferred bases used are the hydroxides of alkali metals and alkaline earth metals. The pyrrolidinone and base are used in equimolar amounts but excess of base is preferred for optimum results. For the hydrolysis in presence of the base, any acid that effectively neutralizes the base may be used; strong mineral acids such as sulfuric acid, hydrochloric acid, nitric acid, perchloric acid, trifluoroacetic acid, trichloroacetic acid, phosphoric acid and the like are preferred.

The 2-pyrrolidinones of the invention are useful compounds in a variety of applications. They are also valuable starting materials for a number of chemical reactions. For instance, the nitrile substituted 2-pyrrolidinones of the invention readily yield the corresponding acids upon alkaline hydrolysis, no significant reversion to the starting acyclic acids occurring; other reactions include the formation of amides, especially the N-substituted amides, the formation of amidines and esters. The acids of the 2-pyrrolidinones of the invention can be reacted to give alkali metal and alkaline earth metal and quaternary ammonium salts.

Moreover, the 2-pyrrolidinones of the invention are useful pesticides, particularly in herbicidal, insecticidal, and fungicidal applications.

The present compounds may be used as stomach poisons for combatting agricultural pests such as bean beetle and armyworms. When compounded and dispersed into 25% wettable powders, and dispersed and applied at the rate of 2 lbs./100 gals. of water per acre, 3,3,5-trimethyl-5-(2 - oxo - 4 - methyl-4-cyanopentyl)-2-pyrrolidinone kills over 70% of these insects. In fungicidal tests, complete kill of *Stemphylium sarcinaeforme* and of *Monilinia fructicola* is obtained in concentrations of 0.1% with 3,3,5-trimethyl-5-(2-oxo-4-carboxypentyl)-2-pyrrolidinone. In herbicidal applications, the present compounds are useful in controlling aquatic weeds in concentrations of 10 p.p.m. In additional tests, indian mallow is controlled by pre-emergence applications.

In agricultural applications, the present compounds, either singly or in mixtures, are applied as dusts, wettable powders, self-dispersible concentrates, in solution or suspension. Compositions suitable as dusts are prepared from the 2-pyrrolidinones of the invention dispersed in a solid carrier, such as talc or clays. The compounds may be used in an amount ranging from ½ to 25% or more, if it is desired. As wettable powders, the compounds of the invention are mixed with a suitable wetting agent, such as a water-soluble surface-active polyethoxyalkylphenoxypolyethoxyethanol and a suitable dispersing agent, such as a formaldehyde condensed naphthalene sulfonate. The wettable powder may then be suspended in an aqueous medium and applied as a spray. Also, the 2-pyrrolidinones may be formulated into self-emulsifible or self-dispersible concentrates or as aqueous sprays.

The following examples, in which all parts are by weight unless otherwise indicated, are offered as further illustration of the compounds and method of the invention and are not intended to be construed as a limitation thereon.

EXAMPLE 1

In a reaction flask, there is placed 1 part of sodium methoxide in 72 parts of ethyl acetate and there are added 50 parts of 2,2-dimethyl-4-oxopentanenitrile in about 5 minutes as temperature rose to 45° C. During the short exotherm, the temperature was maintained at the range of 40° to 45° C. Solid soon precipitated. After standing for about 3 hours, there are added 135 parts more of ethyl acetate and the mixture is heated to reflux to ensure solution. After adding 2.4 parts of concentrated hydrochloric acid, sodium chloride precipitates. It is filtered off. Cooling the filtrate a yield of 37.2 parts of 3,3,5-trimethyl-5-(2-oxo-4-cyanopentyl)-2-pyrrolidinone with a M.P. of 136° to 137.5° C. is obtained. Two parts of crude (130°–135° C.) solid was obtained. The product contains 67.3% carbon (67.2% theoretical), 8.8% hydrogen (8.9% theoretical), 11.3% nitrogen (11.2% theoretical) and has a molecular weight of 250.

Instead of using sodium methoxide, there is employed an equivalent amount of potassium ethoxide with similar results. Similarly, potassium ethoxide is substituted by sodium amide and lithium oxide; the same product is obtained.

EXAMPLE 2

*Hydrolysis of 3,3,5-Trimethyl-5-(2-Oxo-4-Cyanopentyl)-2-Pyrrolidinone*

Five parts of this dimer is refluxed with 6.8 parts barium hydroxide in 80 parts of water for 7 hours until evolution of ammonia ceased. The barium is precipitated with 0.5 normal sulfuric acid. Upon evaporation to 100 parts of water and cooling to 0° C., 2.6 parts of solid having a M.P. of 140° to 143° C. precipitated and recrystallized from water. The neutralization equivalent is 281 and the nitrogen content is 5.01. Calculated values for the dimer acid are neutralization equivalent—269 and nitrogen content 5.2.

Instead of using barium hydroxide, the dimer is refluxed with an equivalent amount of sodium hydroxide and hydrochloric acid is used for neutralization. The acid corresponding to the dimer is obtained in good yields.

EXAMPLE 3

There are mixed 11.1 parts of 3-methyl-4-oxopentanenitrile and 0.25 part of sodium methoxide. The exothermic reaction lasting about ten minutes takes place; it is controlled to 45°–50° C. After standing a few hours, the mixture sets to a solid which is recrystallized from ethyl acetate. The product, 4,5-dimethyl-5-(2-oxo-3-methyl-4-cyanobutyl)-2-pyrrolidinone, melts at 117°–119° C. and has a molecular weight of 230±4; calculated for the dimer—222.

Likewise, 2-methyl-2-ethyl-4-oxopentanonitrile, in the presence of sodium hydride, yields 3,5-dimethyl-3-ethyl-5-(2-oxo-4-methyl-4-cyclohexyl)-2-pyrrolidinone.

EXAMPLE 4

4.4 parts of 4,5-dimethyl-5-(2-oxo-3-methyl-4-cyanobutyl)-2-pyrrolidinone, is refluxed with 3.7 parts of barium hydroxide in 45 parts of water for about ten hours. The barium is precipitated with dilute H₂SO₄. Evaporation of most of the water and cooling gives a good yield of 4,5-dimethyl-5-(2-oxo-3-methyl-4-carboxybutyl)-2-pyrrolidinone.

Substitution of sulfuric acid by methanolic hydrogen chloride yields the same pyrrolidinone product.

EXAMPLE 5

There are mixed 17.3 parts of 2-phenyl-4-oxopentanonitrile and 0.56 part of potassium butoxide. The exothermic reaction is controlled at 40° C. A solid forms after standing overnight at room temperature. Recrystallization from ethyl acetate gives 3-phenyl-5-methyl-5-(2-oxo-4-phenyl-4-cyanobutyl)-2-pyrrolidinone in good yield.

In like manner, 2-xylyl-4-oxopentanonitrile yields 3-xylyl - 5-methyl-(2-oxo-4-xylyl-4-cyanobutyl)-2-pyrrolidinone.

1-(2-oxopropyl)cyclohexanecarbonitrile, upon heating in the presence of dimethyl magnesium, gives

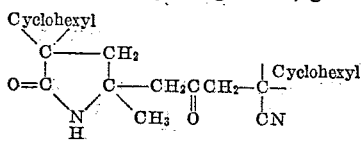

Likewise, 2-butyl-2-naphthyl-4-oxopentanenitrile produces 3-naphthyl-3-butyl-5-methyl-5-(2-oxo-4-naphthyl-4-cyanooctyl)-2-pyrrolidinone.

Substitution of potassium butoxide by equal weights of butyl, lithium, sodium acetylide, dimethyl magnesium yields 3-phenyl - 5 - methyl-5-(2-oxo-4-phenyl-4-cyanobutyl)-2-pyrrolidinone in good yields.

EXAMPLE 6

*Hydrolysis of 3-Phenyl-5-Methyl-5-(2-Oxo-4-Phenyl-4-Cyanobutyl)-2-Pyrrolidinone*

6.9 parts of this dimer is refluxed with 3.7 parts of barium hydroxide in 40 parts of water for about twenty hours. The product, 3-phenyl-5-methyl-5-(2-oxo-4-phenyl-4-carboxybutyl)-2-pyrrolidinone, is isolated as described in Example 4.

Trimethylbenzyl ammonium hydroxide is substituted for barium hydroxide with equivalent results.

EXAMPLE 7

There are mixed 18.1 parts of 2-methyl-2-neopentyl-4-oxopentanonitrile and 2.4 parts of a 75% methanol solution of benzyltrimethylamminoum methoxide. As the exothermic reaction ceases, the mixture is heated one hour on a steam bath. Recrystallization of the crude product gives the product, 3,5-dimethyl-3-neopentyl-5-(2-oxo-4-neopentyl-4-cyanopentyl)-2-pyrrolidinone.

EXAMPLE 8

*Hydrolysis of 3,5-Dimethyl-3-Neopentyl-5-(2-Oxo-4-Neopentyl-4-Cyanopentyl)-2-Pyrrolidinone*

There are refluxed 7.2 parts of this dimer with 3.7 parts of barium hydroxide in water for thirty hours. The product, 3.5-dimethyl-3-neopentyl-5-(2-oxo-4-neopentyl-4-carboxypentyl)-2-pyrrolidinone, is isolated as described in Example 4.

EXAMPLE 9

There are mixed 15.1 parts of 2-acetylcyclohexanecarbonitrile and 1.24 part of sodium phenylacetylide. One half hour after mixing, the reactants are heated on a steam bath to 50° C. for one hour. After two days of storage at 5° C., crystals of the 3-methyl-3-(2-cyanocyclohexanecarbonylmethyl) - 1,3,3a,4,5,6,7,7a - octahydro - 1 - isindolone are obtained.

2-methyl-2-cyclohexyl-4-oxopentanenitrile yields 3,5-dimethyl - 3 - cyclohexyl - 5 - (2 - oxo - 4 - cyclohexyl - 4 - cyanopentyl)-2-pyrrolidinone when treated in the manner shown above. Likewise, 2-acetyl-1-methylcyclopentanecarbonitrile in presence of lithium butoxide yields:

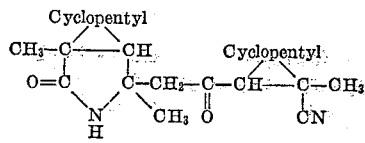

3,3 - dimethyl - 2 - (2 - oxopropyl)bicyclo(2.2.1)heptanone-2-carbonitrile, when allowed to heat in the presence of potassium t-butoxide to about 35° C., gives

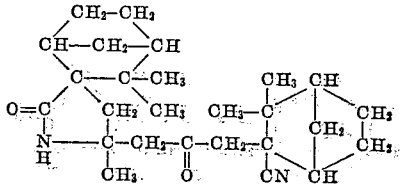

EXAMPLE 10

*Hydrolysis of 3-Methyl-3-(2-Cyanocyclohexanecarbonylmethyl)-1,3,3a,4,5,6,7,7a-octahydro-1-isoindolone*

There are refluxed 6 parts of this dimer with 3.7 parts of barium hydroxide in water for 30 hours. The product, 3-methyl-3-(2-carboxycyclohexanecarbonylmethyl)-1,3,3a,4,5,6,7,7a-octahydro-1-isoindolone is isolated as described in Example 4. Substitution of sulfuric acid by phosphoric gives the acid of the above dimer in good yields.

I claim:

1. A cyanoketone of the formula

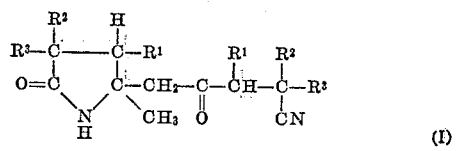

in which (a) $R^1$, $R^2$ and $R^3$, when taken individually, are selected from the group consisting of a hydrogen atom and a group selected from the class consisting of an alkyl of 1 to 6 carbon atoms and a hydrocarbon group of 5 to 10 carbon atoms selected from the class consisting of cycloalkyl, aralkyl, aryl, and alkaryl;

(b) $R^1$ and $R^2$, when taken together with the carbon atoms to which they are bonded form a saturated carbocyclic ring of 5 to 10 carbon atoms; and (c) $R^2$ and $R^3$, when taken together with the carbon atom to which they are bonded, form a saturated carbocyclic ring of 5 to 10 carbon atoms;

with the proviso that $R^1$, $R^2$ and $R^3$ are never all hydrogen atoms concurrently.

2. A cyanoketone of the Formula I of claim 1, in which $R^1$ is an alkyl group of from 1 to 6 carbon atoms, $R^2$ is a hydrogen atom, and $R^3$ is an alkyl group of from 1 to 6 carbon atoms.

3. A cyanoketone of the Formula I of claim 1, in which $R^1$ is a hydrogen atom, and $R^2$ and $R^3$, taken together with the carbon atom to which they are bonded, form a saturated carbocyclic ring of 5 to 10 carbon atoms.

4. A cyanoketone of the Formula I of claim 1 in which $R^1$ and $R^2$, taken together with the carbon atoms to which they are bonded, form a saturated carbocyclic ring of 5 to 10 carbon atoms, and $R^3$ is a hydrogen atom.

5. A cyanoketone of the Formula I of claim 1 in which $R^1$ is a hydrocarbon aryl group of from 6 to 10 carbon atoms, and $R^2$ and $R^3$ are alkyl groups of 1 to 6 carbon atoms.

6. 3 - methyl - 3 - (2 - cynanocyclohexanecarbonylmethyl)-1,3,3a-4,5,6,7,7a-octahydro-1-isoindolone.

7. 3,3,5 - trimethyl - 5 - (2 - oxo - 4 - cyanopentyl) - 2-pyrrolidinone.

8. 4,5 - dimethyl - 5 - (2 - oxo - 3 - methyl - 4 - cyanobutyl)-2-pyrrolidinone.

9. 3 - phenyl - 5 - methyl - 5 - (2 - oxo - 4 - phenyl - 4 - cyanobutyl)-2-pyrrolidinone.

10. 3,5 - dimethyl - 3 - neopentyl - 5 - (2 - oxo - 4 - neopentyl-4-cyanopentyl)-2-pyrrolidinone.

11. A cyanoketoacid of the formula

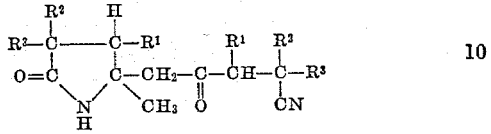

in which (a) $R^1$, $R^2$ and $R^3$, when taken individually, are selected from the group consisting of a hydrogen atom and a group selected from the class consisting of an alkyl of 1 to 6 carbon atoms and a hydrocarbon group of 5 to 10 carbon atoms selected from the class consisting of cycloalkyl, aralkyl, aryl, and alkaryl;

(b) $R^1$ and $R^2$, when taken together with the carbon atoms to which they are bonded, form a saturated carbocyclic ring of 5 to 10 carbon atoms; and (c) $R^2$ and $R^3$, when taken together with the carbon atom to which they are bonded, form a saturated carbocyclic ring of 5 to 10 carbon atoms;

with the proviso that $R^1$, $R^2$ and $R^3$ are never all hydrogen atoms concurrently.

12. A process for preparing adducts of the formula

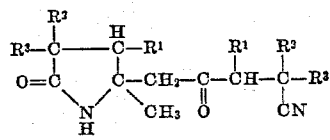

in which (a) $R^1$, $R^2$ and $R^3$, when taken individually, are selected from the group consisting of a hydrogen atom and a group selected from the class consisting of an alkyl of 1 to 6 carbon atoms and a hydrocarbon group of 5 to 10 carbon atoms selected from the class consisting of cycloalkyl, aralkyl, aryl, and alkaryl;

(b) $R^1$ and $R^2$, when taken together with the carbon atoms to which they are bonded form a saturated carbocyclic ring of 5 to 10 carbon atoms; and (c) $R^2$ and $R^3$, when taken together with the carbon atom to which they are bonded, form a saturated carbocyclic ring of 5 to 10 carbon atoms; with the proviso that $R^1$, $R^2$ and $R^3$ are never all hydrogen atoms concurrently; which comprises reacting with a strong alkaline catalyst a cyanoketone of the formula

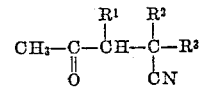

in which $R^1$, $R^2$ and $R^3$ are defined above at a temperature in the range of about $-50°$ to $200°$ C.

13. The process of claim 12 in which the reaction is carried out at a reaction temperature in the range of about $0°$ to $150°$ C.

14. The process of claim 12 in which the reaction is carried out in the presence of an inert organic solvent.

15. A process for the preparation of 3,3,5-trimethyl-5-(2-oxo-4-cyanopentyl)-2-pyrrolidinone which comprises reacting 2,2-dimethyl-4-oxopentane nitrile with sodium methoxide.

16. A process for preparing 4,5-dimethyl-5-(2-oxo-3-methyl-4-cyanobutyl)-2-pyrrolidinone which comprises reacting 3-methyl-4-oxopentanenitrile with sodium methoxide.

17. A process for preparing 3-phenyl-5-methyl-5-(2-oxo-4-phenyl-4-cyanobutyl)-2-pyrrolidinone which comprises reacting 2-phenyl-4-oxopentanenitrile with potassium butoxide.

No references cited.